United States Patent
Xu et al.

(10) Patent No.: US 11,281,527 B2
(45) Date of Patent: Mar. 22, 2022

(54) METHOD AND SYSTEM FOR DATA INTEGRITY

(71) Applicant: EMC IP Holding Company LLC, Hopkinton, MA (US)

(72) Inventors: Xinlei Xu, Beijing (CN); Yousheng Liu, Beijing (CN); Philippe Armangau, Acton, MA (US); Vamsi K Vankamamidi, Hopkinton, MA (US); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/741,989

(22) Filed: Jan. 14, 2020

(65) Prior Publication Data

US 2021/0216396 A1  Jul. 15, 2021

(51) Int. Cl.
*G06F 11/00* (2006.01)
*G06F 11/10* (2006.01)
*G06F 3/06* (2006.01)

(52) U.S. Cl.
CPC ........ *G06F 11/1004* (2013.01); *G06F 3/0619* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,007,053 A * | 4/1991 | Iyer | G06F 11/1008 714/6.11 |
| 10,169,577 B1 * | 1/2019 | Sobel | G06F 21/53 |
| 2003/0177435 A1 * | 9/2003 | Budd | H03M 13/096 714/776 |
| 2010/0011200 A1 * | 1/2010 | Rosenan | G06F 21/71 713/2 |
| 2010/0223432 A1 * | 9/2010 | Eidus | G06F 12/109 711/148 |
| 2012/0079190 A1 * | 3/2012 | Colgrove | G06F 3/0689 711/114 |
| 2014/0040572 A1 * | 2/2014 | Kotagiri | G06F 3/0664 711/159 |

* cited by examiner

*Primary Examiner* — Mujtaba M Chaudry
(74) *Attorney, Agent, or Firm* — Krishnendu Gupta; Deepika Bhayana; Dorothy Wu Chiang

(57) ABSTRACT

A method is used in ensuring data integrity in data storage. A set of physical pages that include data for a virtual page is identified on a storage device. A set of reconstructed pages is generated from other storage devices, and each reconstructed page corresponds to a page in the set of physical pages. One or more pages from the set of physical pages and the set of reconstructed pages with data yielding a checksum that matches a checksum for the virtual page is identified, and data corresponding to the virtual page from the identified one or more pages is obtained.

19 Claims, 12 Drawing Sheets

METHOD AND SYSTEM FOR DATA INTEGRITY

BACKGROUND

Technical Field

This application relates to data integrity for a data storage system.

Description of Related Art

Computer systems may include different resources used by one or more host processors. Resources and host processors in a computer system may be interconnected by one or more communication connections. These resources may include, for example, data storage devices. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes.

Moreover, data storage systems employ various logical structures in memory for organizing data, including logical structures such as a namespace, a mapper, virtual layer blocks (VLBs), and physical layer blocks (PLBs). A namespace is configured to organize storage objects such as LUNs and file systems, and to track logical addresses of the storage objects such as address offsets into LUNs, file system addresses, and so on. A mapper is configured to map the logical addresses of the storage objects in the namespace to virtualization spaces (also referred to herein as "virtual pointers") in the respective VLBs. For example, such a mapper may include multiple pointer arrays in a mapping hierarchy configured as a multi-level tree. Further, the lowest level of the multi-level tree may include an array of leaf pointers, each pointing to one of multiple virtual pointers in a respective VLB. Each such virtual pointer in the respective VLB is configured to point to data, such as a data block, in a respective PLB.

Additionally, data storage systems employ various techniques to assure high availability in the event of system failures. In one example, a storage device may experience a media error, in which stored data becomes corrupted and cannot be read from storage. In another example, the stored data may be tainted due to malfunction of the storage device, namely, the storage device may be writing to storage improperly and erroneously. To protect against possible data and/or metadata loss due to a physical drive failure, the data storage system can be configured such that at least some of its physical drives belong to a redundant array of independent (or inexpensive) disks (RAID) group, which is a storage device array created by logically binding a set of physical drives together. Such a RAID group can represent a logically contiguous address space distributed across a set of physical drives. Further, different RAID levels can be employed to provide varying degrees of fault tolerance for physical drive failures within the RAID group. It is noted that the terms "storage device(s)", "drive(s)", and "disk(s)" are employed herein interchangeably, even though it is well known that not all physical storage devices or drives include rotating disks.

SUMMARY OF THE INVENTION

One aspect of the current technique is a method for ensuring data integrity in a storage system. The method includes identifying, on a storage device, a set of physical pages that include data for a virtual page. The method also includes generating, from other storage devices, a set of reconstructed pages, each reconstructed page corresponding to a page in the set of physical pages. The method further includes identifying one or more pages from the set of physical pages and the set of reconstructed pages with data yielding a checksum that matches a checksum for the virtual page. The method also includes obtaining data corresponding to the virtual page from the identified one or more pages.

The set of physical pages may include a single physical page. The set of physical pages may include a first physical page and a second physical page, and the set of reconstructed pages may include a reconstructed first physical page and a reconstructed second physical page.

The identified one or more pages with data yielding a checksum that matches a checksum for the virtual page may include the first physical page and the second physical page, the reconstructed first physical page and the reconstructed second physical page, the first physical page and the reconstructed second physical page, or the reconstructed first physical page and the second physical page.

The method may include iterating through different combinations of pages from the set of physical pages and the set of reconstructed pages until the checksum based on data in a particular combination of pages matches the checksum for the virtual page. For a particular combination of pages, the method may include identifying data in each page that is included in the virtual page, calculating a checksum based on the identified data, and comparing the calculated checksum against the checksum for the virtual page. Furthermore, for a particular combination of pages, the method may further include identifying at least a subset of the data in each page that is included in the virtual page.

The storage device with the set of physical pages and the other storage devices used to generate the set of reconstructed pages may be in a RAID group.

The method may include applying a redundancy algorithm to data read from the other storage devices.

The method may include adding portions on the storage device or other storage devices to garbage collection.

Another aspect of the current technique is a system, with a processor, for ensuring data integrity in a storage system. The processor is configured to identify, on a storage device, a set of physical pages that include data for a virtual page. The processor is also configured to generate, from other storage devices, a set of reconstructed pages, each reconstructed page corresponding to a page in the set of physical pages. The processor is configured to identify one or more pages from the set of physical pages and the set of reconstructed pages with data yielding a checksum that matches a checksum for the virtual page. The processor if further configured to obtain data corresponding to the virtual page from the identified one or more pages. The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
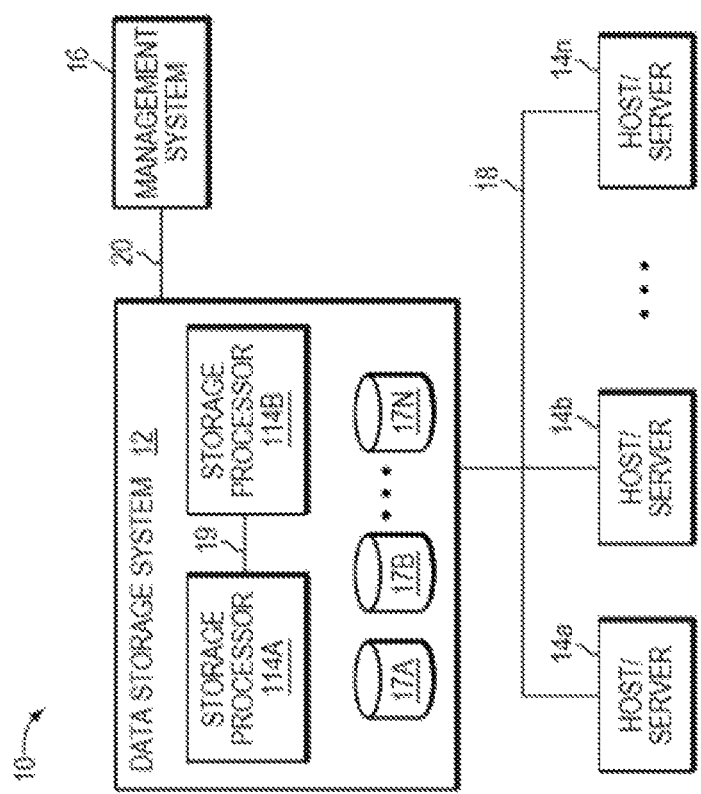
FIG. 1 depicts an exemplary embodiment of a computer system that may utilize the techniques described herein.

Described below is a technique for ensuring data integrity in a storage system, which technique may be used to provide, among other things, identifying, on a storage device, a set of physical pages that include data for a virtual page; generating, from other storage devices, a set of reconstructed pages, each reconstructed page corresponding to a page in the set of physical pages; identifying one or more pages from the set of physical pages and the set of reconstructed pages with data yielding a checksum that matches a checksum for the virtual page; and obtaining data corresponding to the virtual page from the identified one or more pages.

A data storage system divides data to be stored into chunks, calculates a checksum for each chunk, and assigns each chunk to a virtual page. The virtual pages are compressed and stored together on disk. For each virtual page, the data storage system creates an entry, in the virtualization layer, that includes an index, a pointer to the physical address on disk where the virtual page begins, and the checksum. Because a compressed virtual page may occupy less than one physical page on disk, and compressed virtual pages are stored adjacently to one another, any given virtual page may be misaligned with the physical pages. As a result of this misalignment, some virtual pages may span at least two physical pages on disk.

When the storage system receives a read request, the storage system maps the data in the request to the corresponding virtual pages. The storage system identifies the physical page(s) that include the first virtual page, retrieves the physical page(s) from a storage device, decompresses the data, and calculate a checksum for the data corresponding to the virtual page. If this checksum matches the checksum stored in the virtualization layer, the storage system returns the data for the first virtual page and processes the next virtual page.

However, when the storage device has errors, the checksum for the stored data will not match the checksum from the virtualization layer. The storage system retrieves copies of the physical page(s) stored on other storage devices and reconstructs each physical page from this data. Because the virtual page may span two or more physical pages, either of the initially retrieved physical pages may be correct, even though the checksum based on data spanning multiple physical pages is erroneous. Moreover, if the other storage devices have errors, the reconstructed physical page(s) may include incorrect data. To ensure correct data for the virtual page, the storage system tests combinations of physical pages from the initial storage device and reconstructed pages based on the other storage devices until a checksum from one of the combinations matches the checksum stored in the virtualization layer.

In at least some implementations in accordance with the techniques as described herein, the use of data integrity techniques in storage systems can provide one or more of the following advantages: increased robustness of data retrieval despite failure of one or more storage devices, saved storage space on the storage devices via elimination of metadata (e.g., checksums) used to verify the data stored thereon, improved I/O performance, and less frequent downtime to repair storage devices.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

Figure 2:
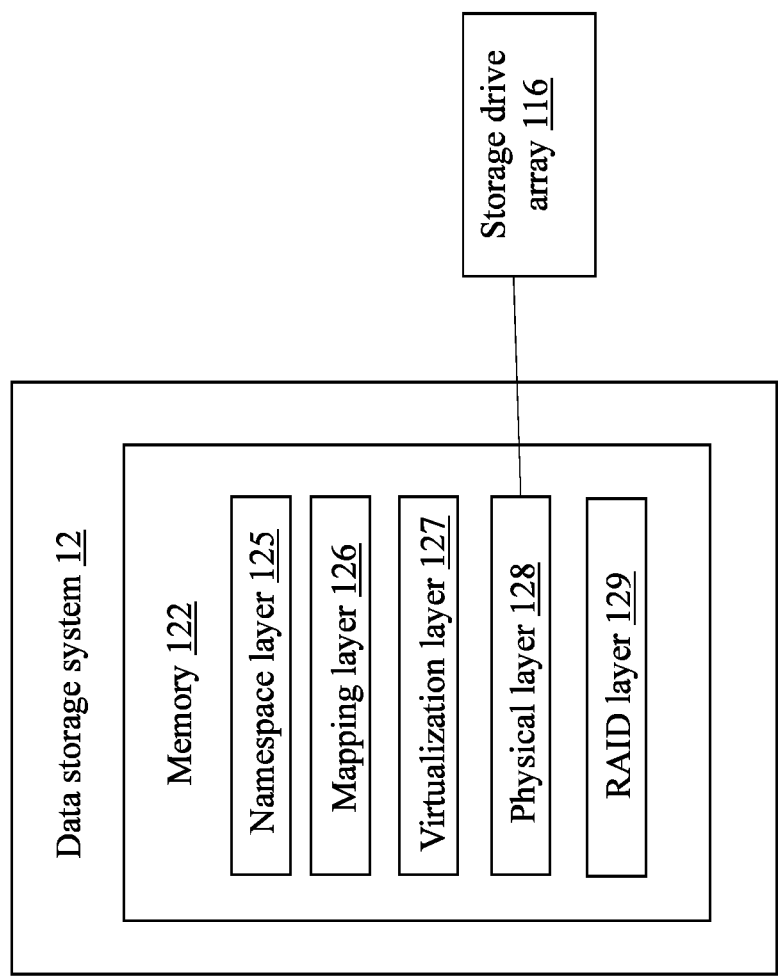
FIG. 2 depicts an exemplary embodiment of a data storage system used in the computer system of FIG. 1.

FIG. 2 depicts an exemplary embodiment of a data storage system 12 used in the computer system 10 of FIG. 1. In addition to the storage processors 114A, 114B and data storage devices 17a-17n depicted in FIG. 1, the data storage system 12 can include a memory 122. The memory 122 can include persistent memory (e.g., flash memory, magnetic memory) and non-persistent memory (e.g., dynamic random access memory (DRAM), static random access memory (SRAM)), and can accommodate a variety of specialized software constructs, including, but not limited to, a namespace layer 125, a mapping layer 126, a virtualization layer 127, a physical layer 128, a RAID layer 129, and/or any other suitable software constructs.

The namespace layer 125 is a logical structure configured to organize storage objects such as VVOLs, LUNs, file systems, and/or any other suitable storage objects, accessible to the plurality of hosts 14a-14n. The namespace layer 125 can track logical addresses of storage objects, such as offsets into LUNs or file system addresses. For example, if a LUN made up of one or more extents were to have a maximum size of 10 gigabytes (Gb), then the namespace layer 125 may provide a 10 Gb logical address range to accommodate the LUN.

The mapping layer 126 is a logical structure configured to map the logical addresses of the storage objects in the namespace layer 125 to virtualization structures (also referred to herein as "virtual pointers") in the virtualization layer 127. To that end, the mapping layer 126 can include multiple pointer arrays (e.g., indirect pointer arrays) in a mapping hierarchy configured as a multi-level tree. For example, such a pointer array may include a pointer to a child pointer array, and may be pointed to by a pointer in a parent pointer array.

The virtualization layer 127 is a logical structure configured to provide block virtualization. For example, the virtualization layer 127 may have an aggregation of virtual layer blocks (VLBs), each of which may include a plurality of virtual pointers (e.g., 512 virtual pointers). Further, the lowest level of the multi-level tree in the mapping layer 126 may include an array of leaf pointers, each of which may point to one of the virtual pointers included in a respective VLB of the virtualization layer 127.

The physical layer 128 is configured to store an aggregation of physical layer blocks (PLBs). For example, such a PLB may include an aggregation of compressed data blocks, individually compressed data blocks, and/or uncompressed data blocks. Further, each virtual pointer included in a respective VLB of the virtualization layer 127 may point to a data block in a respective PLB of the physical layer 128. It is noted that, although the physical layer 128 is described herein using the term "physical", an underlying storage drive array 116 is typically responsible for the actual, physical storage of host data. The storage drive array 116 can include the storage devices 17a-17n depicted in FIG. 1. The storage drive array 116 may include magnetic disk drives, electronic flash drives, optical drives, and/or any other suitable physical drives. The storage drive array 116 can be attached to one or more I/O channels of the data storage system 12, while also being accessible over the network 18.

In this embodiment, the RAID layer 129 is configured to organize the physical drives of the storage drive array 116 as one or more RAID groups, in which data can be written as RAID stripes across at least some of the physical drives. Although the embodiment of the data storage system 12 depicted in FIG. 2 includes RAID layer 129, in other embodiments, the data storage system 12 may omit this layer 129.

Figure 3:
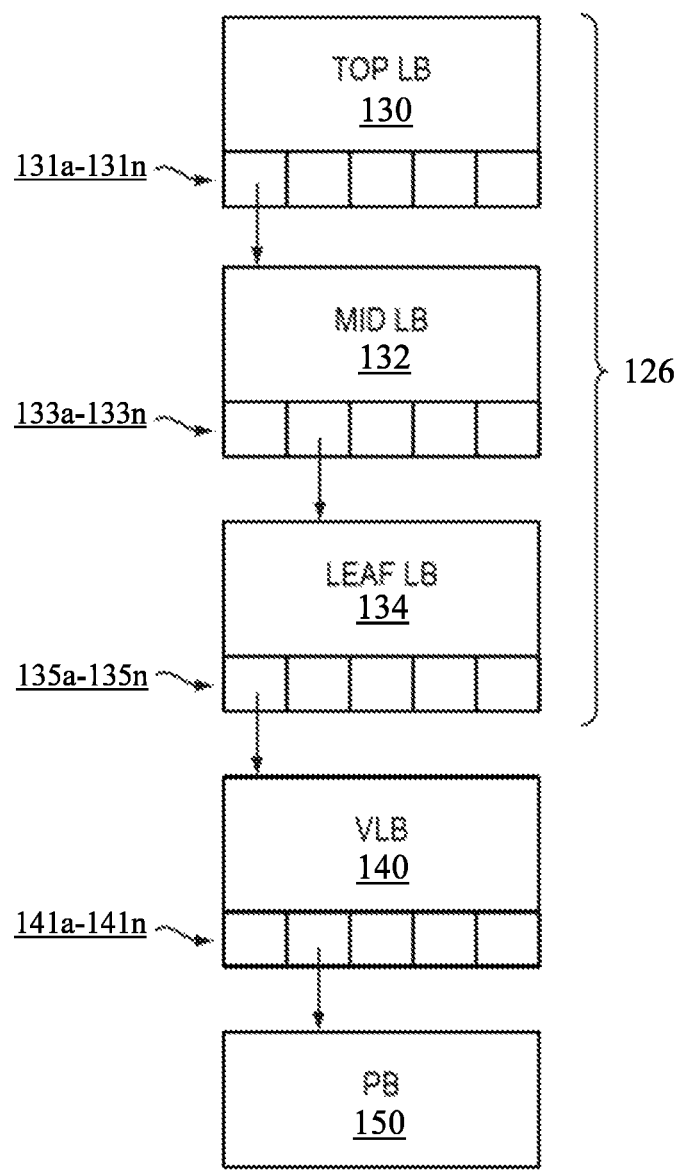
FIG. 3 is an exemplary block diagram depicting the mapping layer, virtualization layer, and physical layer used in the data storage system of FIG. 2.

FIG. 3 is an exemplary block diagram depicting the mapping layer 126, virtualization layer 127, and physical layer 128 used in the data storage system 12 of FIG. 2. In this embodiment, the mapping layer 126 includes a collection of logical blocks organized in a tree structure with three levels: the top-level logical blocks (top LBs) 130, the mid-level logical blocks (mid LBs) 132, and the leaf logical blocks (leaf LBs) 134. Various embodiments of the mapping layer 126 may include tree structures with other numbers of levels, such as a two-level tree, or a flat table that maps logical locations with physical locations.

In some embodiments, a top LB 130 has one or more pointers 131a-n associated with it. In some embodiments the one or more pointers 131a-n are located within the top LB 130 at indices, whereby each of the one or more pointers 131a-n is located at a different index within the top LB 110. In some embodiments, the one or more pointers 131a-n each point to a mid LB 132.

In some embodiments, each mid LB 111320 has one or more pointers 133a-n associated with it. In some embodiments the one or more pointers 133a-n are located within each of the respective one or more mid LBs 132 at indices, whereby each of the one or more pointers 133a-n is located at a different index within each of the respective one or more mid LBs 132. In some embodiments, the one or more pointers 133a-n each point to a leaf LB 134.

In some embodiments, each leaf LB 134 has one or more pointers 135a-n associated with it. In some embodiments, the one or more pointers 135a-n are located within each of the respective one or more leaf LBs 134 at indices, whereby each of the one or more pointers 135a-n is located at a different index within each of the respective one or more leaf LBs 134. In some embodiments, the one or more pointers 135a-n each point to a virtual block (VLB) 140.

Although the embodiment in FIG. 3 depicts logical blocks organized in a three-level tree structure, in various embodiments, the tree structure may have other numbers of levels that are organized and described according to other schema. For example, a four-level tree may include super blocks, which point to top indirect blocks. Top indirect blocks may point to mid indirect blocks, and mid indirect blocks may point to leaf indirect blocks. Finally, the leaf indirect blocks may point to virtual blocks VLB 40.

In some embodiments, each VLB 140 has one or more pointers 141a-n associated with it. In some embodiments, the one or more pointers 141a-n are located within each of the respective one or more VLBs 140 at indices, whereby each of the one or more pointers 141a-n is located at a different index within each of the respective one or more VLBs 140. In some embodiments, the one or more pointers 141a-n each point to a block (PB) 150 in physical storage.

In some embodiments, the pointers 131a-n, 133a-n, 135a-n, and 141a-n are a combination of an address of the block pointed to and an index within the pointed-to block. In some embodiments, the address of the block pointed to and the index within the pointed-to block are encoded into a single value. In some embodiments, the address of the block pointed-to and the index within the pointed-to block are stored as separate values and used together or combined when needed (e.g., when locating the actual contents at the specific location being referenced). In this way, the mapping layer 126, virtualization layer 127, and physical layer 128 can be traversed by following the pointers.

Figure 4:
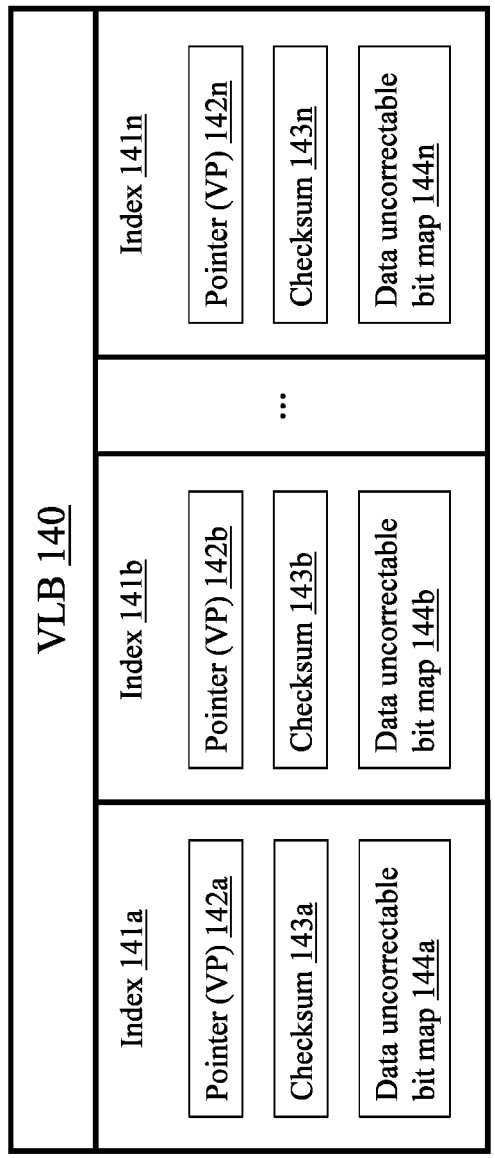
FIG. 4 depicts a VLB in the virtualization layer used in the data storage system of FIG. 2.

FIG. 4 depicts a VLB 140 in the virtualization layer 127 used in the data storage system 12 of FIG. 2. The VLB 140 includes indices 141a-141n. Each index 141 includes a pointer 142 for a virtual page (VP), which may include the physical address in physical storage where the virtual page begins. Each index 141 also includes a checksum 143 for the data of the virtual page. In some embodiments, each index 141 also includes a data uncorrectable bitmap 144. Each bit in the bitmap 144 indicates whether a portion of data in the virtual page is correctly stored. For example, in some embodiments, a virtual page includes 4 KB of data. If its corresponding bitmap 144 includes eight bits, each bit indicates the validity of a 512-byte portion of the virtual page.

Figure 5:
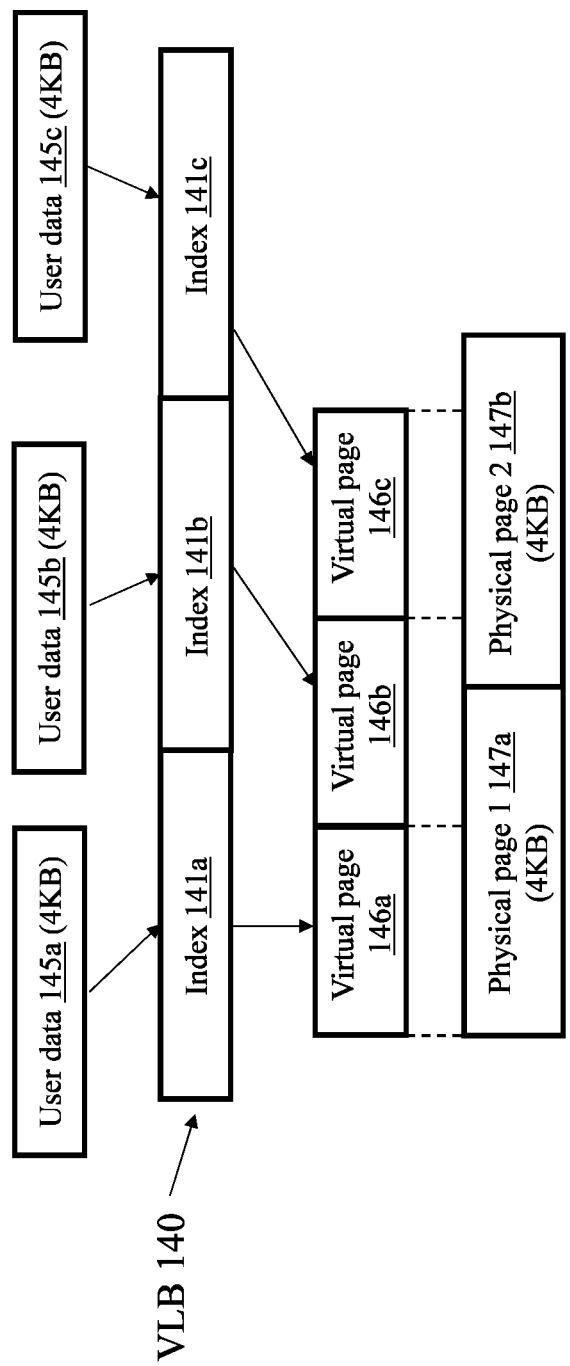
FIG. 5 is a schematic diagram depicting how the virtualization layer, the physical layer, and the storage drive array relate in the data storage system of FIG. 1.

FIG. 5 is a schematic diagram depicting, in an exemplary embodiment, how the virtualization layer 127, the physical layer 128, and the storage drive array 116 relate in the data storage system 12 of FIG. 1. When the data storage system 12 receives data 145 to be stored, the data storage system 12 divides the data 145 into chunks, calculates the checksum 143 for each chunk, assigns each chunk to a virtual page 146, and stores the checksums 143 in the indices 141 of the VLB 140. The data storage system 12 compresses and stores the data 145 on physical pages 147 in the storage devices 17a-17n.

In this embodiment, a chunk is 4 KB, and each physical page is also 4 KB. Because the data storage system 12 compresses the chunk for each virtual page 146, the original 4 KB of data is reduced to an amount less than 4 KB. Consequently, the data storage system 12 does not exhibits a 1:1 ratio between virtual pages 146 and physical pages 147, and many compressed virtual pages 146 do not occupy an entire physical page 147. Furthermore, because the data storage system 12 stores virtual pages 146 together in the storage drive array 116, the beginnings of most virtual pages 146 do not align with the beginnings of physical pages 147. As shown in FIG. 5, virtual pages 146 on the storage devices 17a-17n may begin in the middle of a physical page 147, and as a result, some may span more than one physical page 147. Consequently, when the data storage system 12 receives a request to read data, the data storage system 12 may need to access two physical pages 147 to obtain data for one virtual page 146.

In various embodiments, a virtual page 146 may be sufficiently compressed to be stored on a single physical page 147, despite beginning in the middle of the page 147. The data storage system 12 only needs to access a single physical page 147 to return the data for the virtual page 146. Furthermore, other data storage systems 12 may include virtual pages 146 and physical pages 147 of other sizes, such as 8 KB. Additionally, the virtual pages 146 and physical pages 147 may be different sizes. In some embodiments, when the size of virtual pages 146 is larger than that of physical pages 147, data for a virtual page 146 may span more than two physical pages 147, even if the data has been compressed. Thus, in these situations, the data storage system 12 may need to access data from multiple physical pages 147 to return data for a virtual page 146 in the read request.

Figure 6:
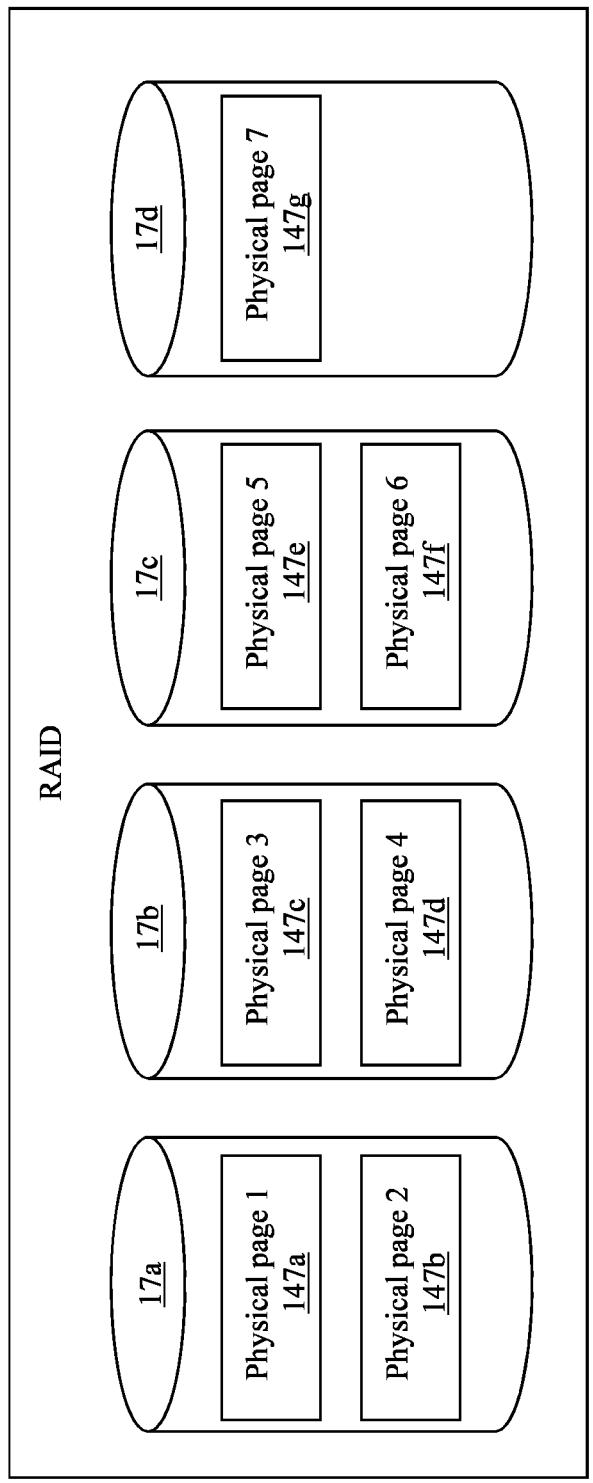
FIG. 6 is a schematic diagram demonstrating how different physical pages made be stored on storage devices in the storage drive array of FIGS. 1 and 2.

FIG. 6 is a schematic diagram demonstrating how different physical pages 147 made be stored on storage devices 17a-n in the storage drive array 116 of FIGS. 1-2. In this embodiment, storage device 17a stores physical pages 1 (147a) and 2 (147b), storage device 17b stores physical pages 3 (147c) and 4 (147d), storage device 17c stores physical pages 5 (147e) and 6 (1470), and storage device 17d stores physical page 7 (147g). Furthermore, additional copies of the physical pages 1-7 (147) may be stored on any storage device 17 in the storage drive array 116. For example, storage device 17d may also store copies of physical pages 1 (147a) and 2 (147b), and storage device 17b may store copies of physical page 7 (147g). Although FIG. 6 illustrates storage devices 17a-17d in a RAID group, in other embodiments, the storage devices 17a-17d may not be in RAID.

Figure 7:
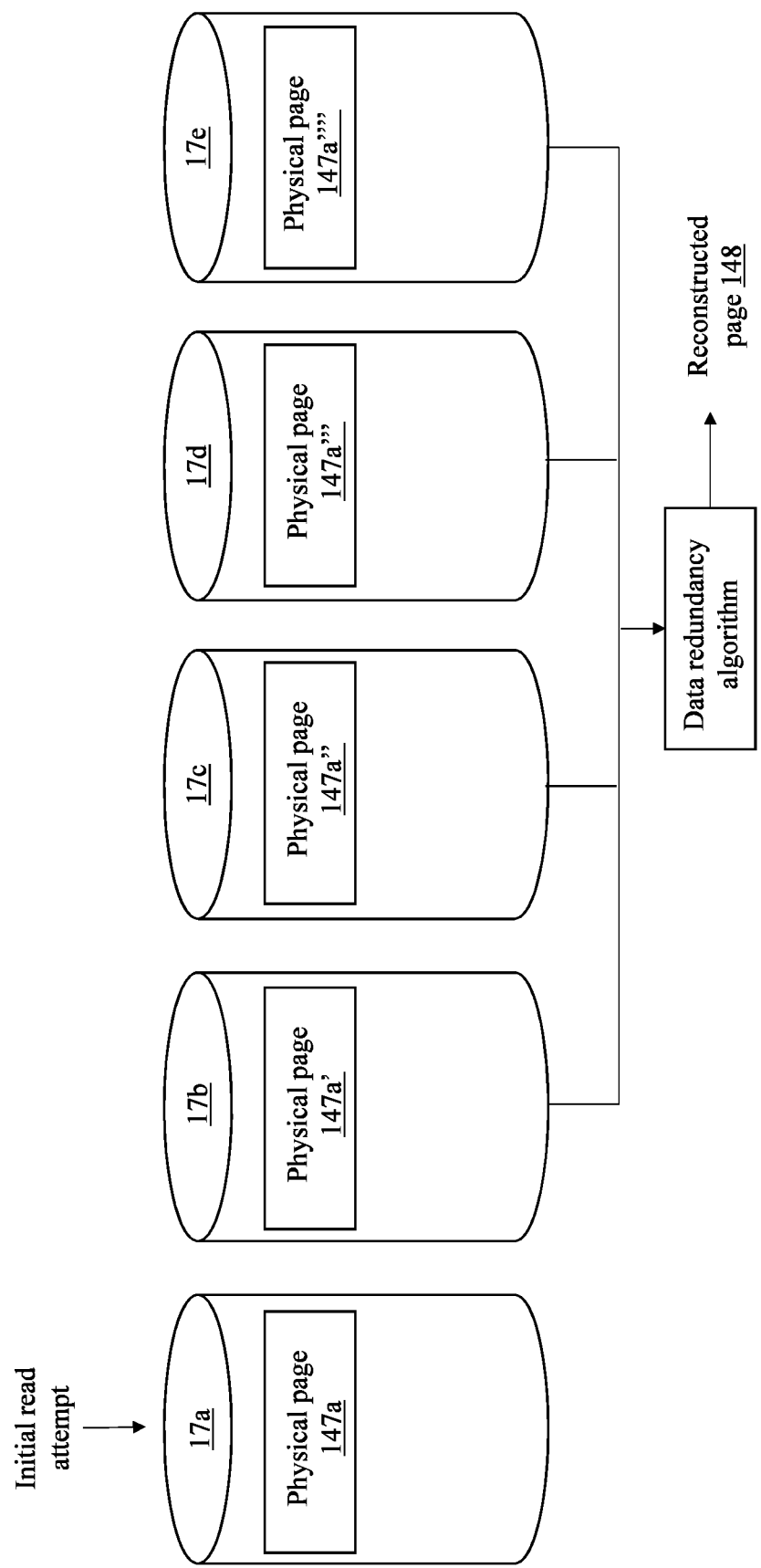
FIG. 7 is a schematic diagram that illustrates how the data storage system of FIG. 1 ensures data integrity for a single physical page.

FIG. 7 is a schematic diagram that illustrates how the data storage system 12 of FIG. 1 ensures data integrity for a single page. The system 12 reads a physical page 147a, and if data from the physical page 147a is problematic, the system 12 reconstructs the same physical page 147a from data on the other storage devices 17b-17e. This exemplary illustration of how data integrity for one virtual page is assured assumes that a virtual page is contained within a single physical page. In this embodiment, all of the storage devices 17a-17e store a copy of the same physical page (147a). The data storage system 12 reads the physical page 147a from storage device 17a, decompresses the retrieved data, identifies the data corresponding to the virtual page 146a, and calculates a checksum based on this data.

If the checksum matches the stored checksum 143a for the virtual page 146a, the data storage system 12 returns the data for the virtual page 146a from the physical page 147a. However, if the checksums do not match, the data storage system 12 read copies of the same physical page 147a', 147a", 147a'", 147a"" from the other storage devices 17b-17e. Data for each physical page 147a', 147a", 147a'", 147a"" is decompressed, and the data storage system 12 applies a redundancy algorithm to output a reconstructed physical page 148. Because the algorithm leverages the redundancy across multiple copies of a physical page, the data for the reconstructed page is more robust against errors that may occur on one or more storage devices 17.

The data storage system 12 identifies the data on the reconstructed physical page 148 corresponding to the virtual page 146a and calculates a checksum. If this checksum matches the stored checksum 143a for the virtual page 146a, the data storage system 12 returns the data for the virtual page 146a from the reconstructed physical page 148. Otherwise, the system 12 returns an error. In some embodiments, the system 12 identifies the problematic portion(s) of the virtual page and sets the corresponding bit(s) of the uncorrectable data uncorrectable bitmap 144 accordingly. Furthermore, these portions may be added to garbage collection, such that correct data will be written to the storage device 17 and the incorrect data will no longer be accessed.

For any given read request, the data storage system 12 may initially access any storage device 17 in the storage drive array 116 that stores a copy of the desired physical page. In the embodiment depicted in FIG. 7, the data storage system 12 reads the physical page 147a on the storage device 17a. Alternatively, the data storage system 12 could read the physical page 147a" on storage device 17c, and reconstruct the physical page 148a based on data from storage devices 17a, 17b, 17d, and 17e. In yet another example, the data storage system 12 could read the physical page 147a' on storage device 17e, and reconstruct the physical page 148a based on data from storage devices 17a, 17b, 17c, and 17d. In this manner, for each read request that requires access to disk, the data storage system 12 may access any storage device 17a-17e to retrieve an initial copy of a physical page 147a.

As discussed above, virtual pages 146 that span more than one physical page 147 require the data storage system 12 to retrieve data from multiple physical pages 147. Because the data for any given physical page 147, or reconstruction 148 thereof, may be correct or incorrect, the data storage system 12 must determine the combination of pages 147, 148 that yields correct data for the virtual page 146. The data storage system 12 iterates through different combinations until the data for the virtual page 146 from a given combination produces a checksum matching the stored checksum 143 for the virtual page 146.

Figure 8:
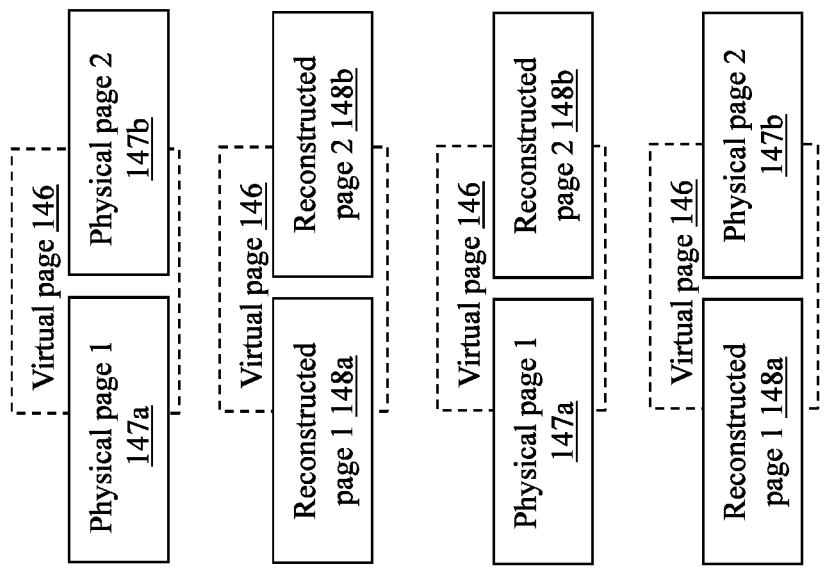
FIG. 8 is a diagram demonstrating exemplary combinations of pages that the data storage system iterates through to obtain data for a virtual page spanning two physical pages.

FIG. 8 is a diagram demonstrating exemplary combinations of pages 147, 148 that the data storage system 12 iterates through to obtain data for a virtual page 146 spanning two physical pages 147a, 147b. In some embodiments, the data storage system 12 begins with the physical pages 147a, 147b retrieved from a storage device 17a. The data storage system 12 identifies data from each physical page 147a, 147b that corresponds to the virtual page 146, and calculates a checksum based on this data. If the checksum fails to match the stored checksum 143 for the virtual page 146, the data storage system 12 reconstructs each physical page 148a, 148b from data stored on other storage devices 17b-17n.

The data storage system 12 tests combinations of the physical pages 147a, 147b and their reconstructed counterparts 148a, 148b. For example, the data storage system 12 may first test the checksum for data from the reconstructed physical pages 148a, 148b that corresponds to the virtual page 146. The next combination may include the first physical page 147a from storage device 17a and the reconstructed second page 148b, and the subsequent combination may include the reconstructed first page 148a and the second physical page 147b from storage device 17a. In various embodiments, other orders of the combinations of pages 147, 148 may be used.

In further embodiments, in which the virtual page 146 spans more than two physical pages 147, the data storage system 12 may first test the checksum based on the physical pages 147 retrieved from storage device 17a, followed by the checksum based on the reconstructive physical pages 148b. Subsequently, the data storage system 12 may test combinations with one reconstructed page 148, with the remaining pages being the physical pages 147 from storage device 17a. For example, if a virtual page 146 spans three physical pages 147, the combinations tested may include the reconstructed first page 148a and the second and third physical pages 147b, 147c, the reconstructed second page 148b and the first and third physical pages 147a, 147c, and the reconstructed third page 148c and the first and second physical pages 147a, 147b. If checksums for these combinations fail, the next combinations may include two reconstructive pages 148 and one physical page 147. The order of combinations described herein is merely exemplary; other orders may be used, as would be appreciated by one of ordinary skill in the art.

Figure 9:
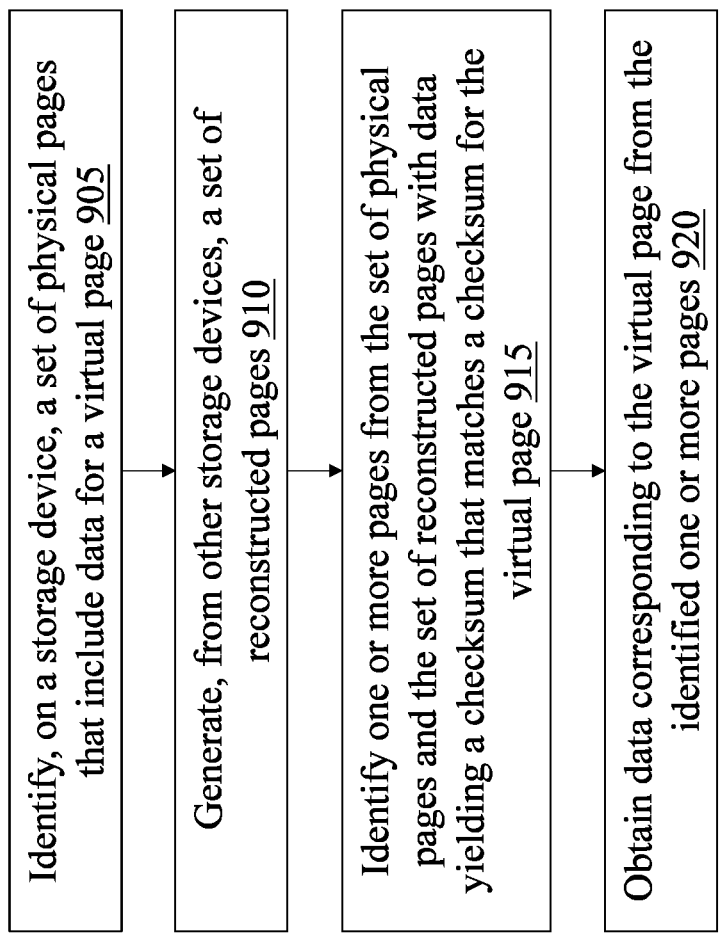
FIGS. 9-10 are exemplary flow diagrams of methods for ensuring data integrity in a data storage system, according to techniques described herein.

FIG. 9 is an exemplary flow diagram 900 of a method for ensuring data integrity in a data storage system 12. The data storage system 12 identifies a set of physical pages, on a storage device, that include data for a virtual page (step 905). The data storage system 12 generates a set of reconstructed pages from other storage devices (step 910). Each reconstructed page in the set corresponds to a page in the set of physical pages. The data storage system 12 identifies one or more pages from the set of physical pages and the set of reconstructed pages with data yielding a checksum that matches a checksum for the virtual page (step 915). Lastly, the data storage system 12 obtains data corresponding to the virtual page from the identified one or more pages (step 920).

Figure 10A:
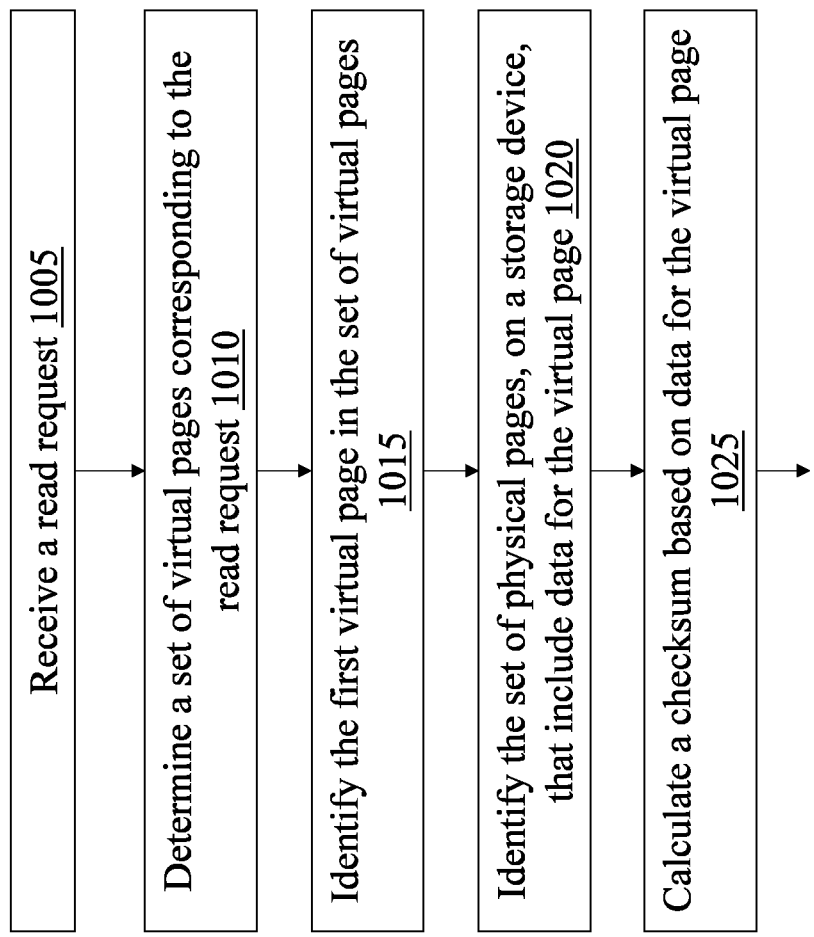
Figure 10B:
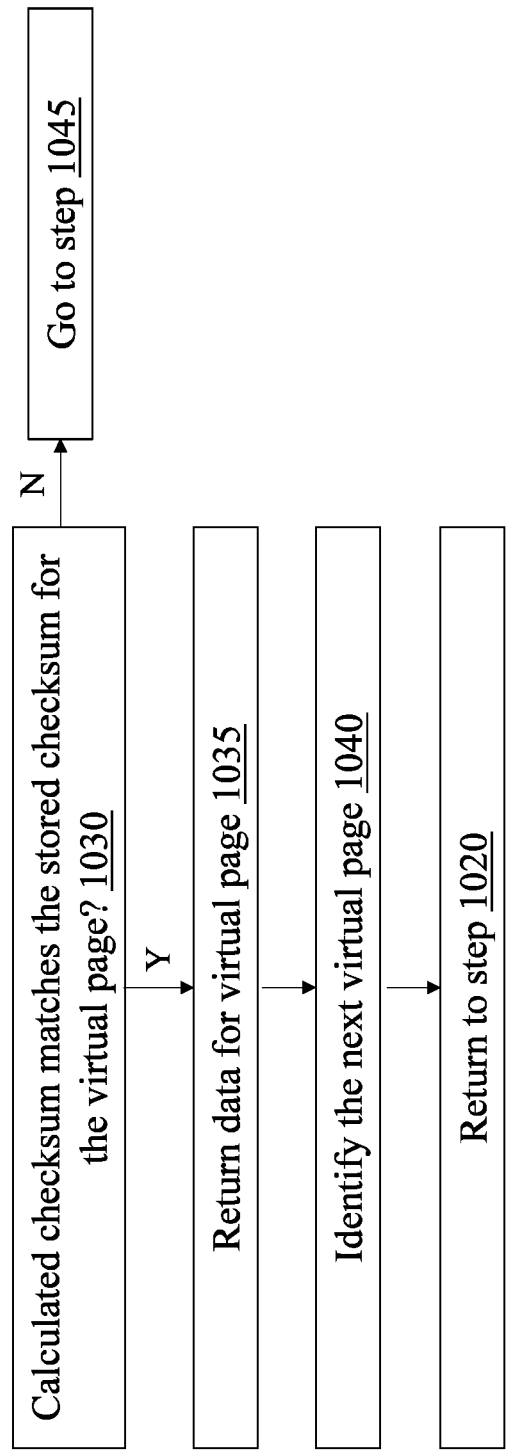
Figure 10C:
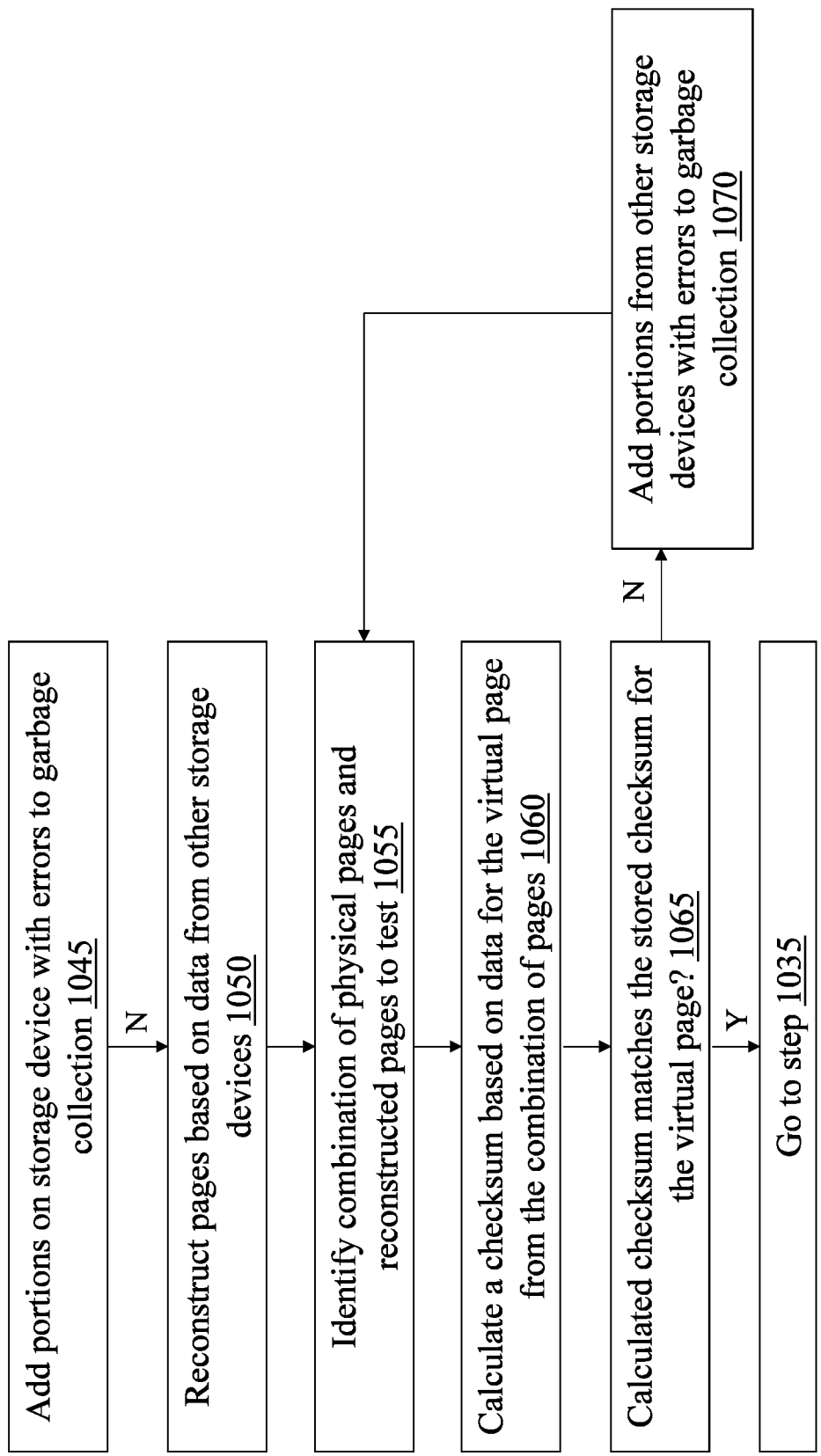

FIGS. 10A-10C depict an exemplary flow diagram 1000 of another method for ensuring data integrity in a data storage system 12. The data storage system 12 receives a read request (step 1005). The data storage system 12 determines a set of virtual pages corresponding to the read request (step 1010), and identifies the first virtual page to be processed (step 1015). When the data for the request is not stored in cache, the data must be retrieved from the storage drive array 116. The data storage system 12 identifies the set of physical pages on a storage device that include data for the virtual page (step 1020).

The data storage system 12 reads the physical pages from the storage device, and calculates a checksum based on data for the virtual page (step 1025). If the calculated checksum matches the stored checksum for the virtual page (step 1030), then the data storage system 12 returns the data for the virtual page (step 1035). Then, the data storage system 12 identifies the next virtual page in the read request (step 1040), and returns to step 1020 to process this next virtual page.

If the calculated checksum does not match the stored checksum for the virtual page, the data storage system 12 identifies the portions on the storage device with errors. Based on these errors, the data storage system 12 changes bits in the data uncorrectable bitmap 144 for the virtual page. The data storage system 12 adds the portions on the storage device with errors to garbage collection (step 1045).

Then, the data storage system 12 reconstructs the pages based on data from the other storage devices (step 1050). The reconstructed pages may be created by applying a redundancy algorithm to data from the other storage devices. The data storage system 12 identifies a combination of physical pages and reconstructed pages to test (step 1055). For example, the combination may include the set of reconstructed pages. Alternatively, the combination may include a single physical page, with the remaining pages being reconstructed pages. The data storage system 12 calculates a checksum based on data for the virtual page from the combination of pages (step 1060).

If the calculated checksum does not match the stored checksum for the virtual page, the data storage system 12 identifies the portions on the other storage device with errors, and adds the portions from the other storage device with errors to garbage collection (step 1070). Then, the data storage system 12 returns to step 1055, and iterates through other combinations of pages and reconstructed pages until a combination yielding the correct checksum for the virtual page is found. When this combination is determined, the data storage system 12 returns the data for the virtual page (step 1035), identifies the next virtual page in the read request (step 1040), and returns to step 1020 to process this next virtual page until all of the virtual pages for the read request have been processed.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for ensuring data integrity in a storage system, the method comprising:
   identifying, on a storage device in a RAID group, a set of physical pages that include data for a virtual page, the virtual page spanning the set of physical pages;
   using remaining storage devices in the RAID group to generate a set of reconstructed pages, each reconstructed page corresponding to a page in the set of physical pages;
   identifying a combination of pages from the set of physical pages and the set of reconstructed pages that includes data which yields a checksum that matches a checksum for the virtual page; and
   obtaining data corresponding to the virtual page from the identified combination of pages.

2. The method of claim 1, wherein the set of physical pages includes a single physical page.

3. The method of claim 1, wherein the set of physical pages includes a first physical page and a second physical page, and the set of reconstructed pages includes a reconstructed first physical page and a reconstructed second physical page.

4. The method of claim 3, wherein the identified combination of pages includes:
- the first physical page and the second physical page;
- the reconstructed first physical page and the reconstructed second physical page;
- the first physical page and the reconstructed second physical page; or
- the reconstructed first physical page and the second physical page.

5. The method of claim 1, wherein identifying the combination of pages comprises:
- iterating through different combinations of pages from the set of physical pages and the set of reconstructed pages until the checksum based on data in a particular combination of pages matches the checksum for the virtual page.

6. The method of claim 5, wherein iterating through the different combinations of pages comprises:
- identifying, in a particular combination of pages, data in each page that is included in the virtual page;
- calculating a checksum based on the identified data; and
- comparing the calculated checksum against the checksum for the virtual page.

7. The method of claim 6, wherein identifying, in a particular combination of pages, the data in each page that is included in the virtual page comprises:
- identifying at least a subset of the data in each page that is included in the virtual page.

8. The method of claim 1, wherein generating the set of reconstructed pages comprises:
- applying a redundancy algorithm to data read from the other storage devices.

9. The method of claim 1, further comprising:
- adding portions on the storage device or other storage devices to garbage collection.

10. A system for use in ensuring data integrity in data storage, the system comprising a processor configured to:
- identify, on a storage device in a RAID group, a set of physical pages that include data for a virtual page, the virtual page spanning the set of physical pages;
- use remaining storage devices in the RAID group to generate a set of reconstructed pages, each reconstructed page corresponding to a page in the set of physical pages;
- identify a combination of pages from the set of physical pages and the set of reconstructed pages that includes data which yields a checksum that matches a checksum for the virtual page; and
- obtain data corresponding to the virtual page from the identified combination of pages.

11. The system of claim 10, wherein the set of physical pages includes a single physical page.

12. The system of claim 10, wherein the set of physical pages includes a first physical page and a second physical page, and the set of reconstructed pages includes a reconstructed first physical page and a reconstructed second physical page.

13. The system of claim 12, wherein the identified combination of pages includes:
- the first physical page and the second physical page;
- the reconstructed first physical page and the reconstructed second physical page;
- the first physical page and the reconstructed second physical page; or
- the reconstructed first physical page and the second physical page.

14. The system of claim 10, wherein the processor is further configured to:
- iterate through different combinations of pages from the set of physical pages and the set of reconstructed pages until the checksum based on data in a particular combination of pages matches the checksum for the virtual page.

15. The system of claim 14, wherein the processor is further configured to:
- identify, in a particular combination of pages, data in each page that is included in the virtual page;
- calculate a checksum based on the identified data; and
- compare the calculated checksum against the checksum for the virtual page.

16. The system of claim 15, wherein the processor is further configured to:
- identify at least a subset of the data in each page that is included in the virtual page.

17. The system of claim 10, wherein the storage device with the set of physical pages and the other storage devices used to generate the set of reconstructed pages are in a RAID group.

18. The system of claim 10, wherein the processor is further configured to:
- apply a redundancy algorithm to data read from the other storage devices.

19. The system of claim 10, wherein the processor is further configured to:
- add portions on the storage device or other storage devices to garbage collection.

* * * * *